(12) United States Patent
Tamura et al.

(10) Patent No.: US 11,422,444 B2
(45) Date of Patent: Aug. 23, 2022

(54) PROJECTOR

(71) Applicant: SEIKO EPSON CORPORATION, Tokyo (JP)

(72) Inventors: Tetsuya Tamura, Matsumoto (JP); Hiroyuki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/128,428

(22) Filed: Dec. 21, 2020

(65) Prior Publication Data

US 2021/0191240 A1 Jun. 24, 2021

(30) Foreign Application Priority Data

Dec. 24, 2019 (JP) .............................. JP2019-232475

(51) Int. Cl.
| | |
|---|---|
| G03B 21/14 | (2006.01) |
| H04N 9/31 | (2006.01) |
| G02B 7/182 | (2021.01) |
| G03B 21/44 | (2006.01) |
| H04N 5/74 | (2006.01) |

(52) U.S. Cl.
CPC ........... *G03B 21/145* (2013.01); *G02B 7/182* (2013.01); *G03B 21/44* (2013.01); *H04N 5/74* (2013.01)

(58) Field of Classification Search
CPC .... G03B 21/14; G03B 21/142; G03B 21/145; H04N 9/31; H04N 5/74; G02B 26/02; G02B 26/023; G02B 7/182

USPC .......................................................... 353/88
See application file for complete search history.

(56) References Cited

U.S. PATENT DOCUMENTS

| | | | |
|---|---|---|---|
| 8,801,195 B2 * | 8/2014 | Mochizuki | G03B 21/2053 353/88 |
| 2009/0174869 A1 * | 7/2009 | Inui | G03B 21/208 353/38 |
| 2009/0225389 A1 * | 9/2009 | Nakano | G02B 27/149 359/236 |

FOREIGN PATENT DOCUMENTS

| | | |
|---|---|---|
| JP | 2011-223350 | 11/2011 |
| JP | 2015-184417 | 10/2015 |
| JP | 2019-082529 | 5/2019 |

* cited by examiner

*Primary Examiner* — William C. Dowling
(74) *Attorney, Agent, or Firm* — Dority & Manning, P.A.

(57) ABSTRACT

A projector according to the disclosure includes a projection system projecting image light onto a target projection surface, and a shutter unit that is arranged at a light incident side of the projection system and that can block an optical path. The shutter unit has a drive motor, a transmission member transmitting a rotational drive force of the drive motor, and a shutter member arranged on the optical path and moving, linked to a movement of the transmission member. The shutter member is provided facing a facing area facing the projection system. At least a part of the transmission member is provided facing the facing area. The drive motor is provided outside the facing area.

8 Claims, 10 Drawing Sheets

PROJECTOR

The present application is based on, and claims priority from JP Application Serial Number 2019-232475, filed Dec. 24, 2019, the disclosure of which is hereby incorporated by reference herein in its entirety.

BACKGROUND

1. Technical Field

The present disclosure relates to a projector.

2. Related Art

For example, JP-A-2011-223350 and JP-A-2015-184417 disclose a projector having a light-blocking shutter.

The light-blocking shutter disclosed in JP-A2011-223350, when arranged between a dichroic prism and a projection lens, needs a large space and therefore poses the problem of increase in the size of the projector. The light-blocking shutter disclosed in JP-A-2015-184417 takes a small space between a dichroic prism and a projection lens but needs a large space around the projection lens and therefore poses the problem of increase in the size of the projector.

SUMMARY

To solve the foregoing problems, a projector according to an aspect of the disclosure includes: a light source; a light modulation device modulating light emitted from the light source according to image information and thus forming image light; a projection system projecting the light modulated by the light modulation device onto a target projection surface; an optical member guiding the light from the light modulation device to the projection system; and a shutter unit that is arranged between the optical member and the projection system and that can block an optical path between the optical member and the projection system. The shutter unit has: a drive motor; a transmission member transmitting a rotational drive force of the drive motor; and a shutter member that is arranged at an optical path of the light emitted from the optical member and that moves, linked to a movement of the transmission member. The shutter member is provided facing a facing area facing the projection system. At least a part of the transmission member is provided facing the facing area. The drive motor is provided outside the facing area.

DESCRIPTION OF EXEMPLARY EMBODIMENTS

Figure 1:
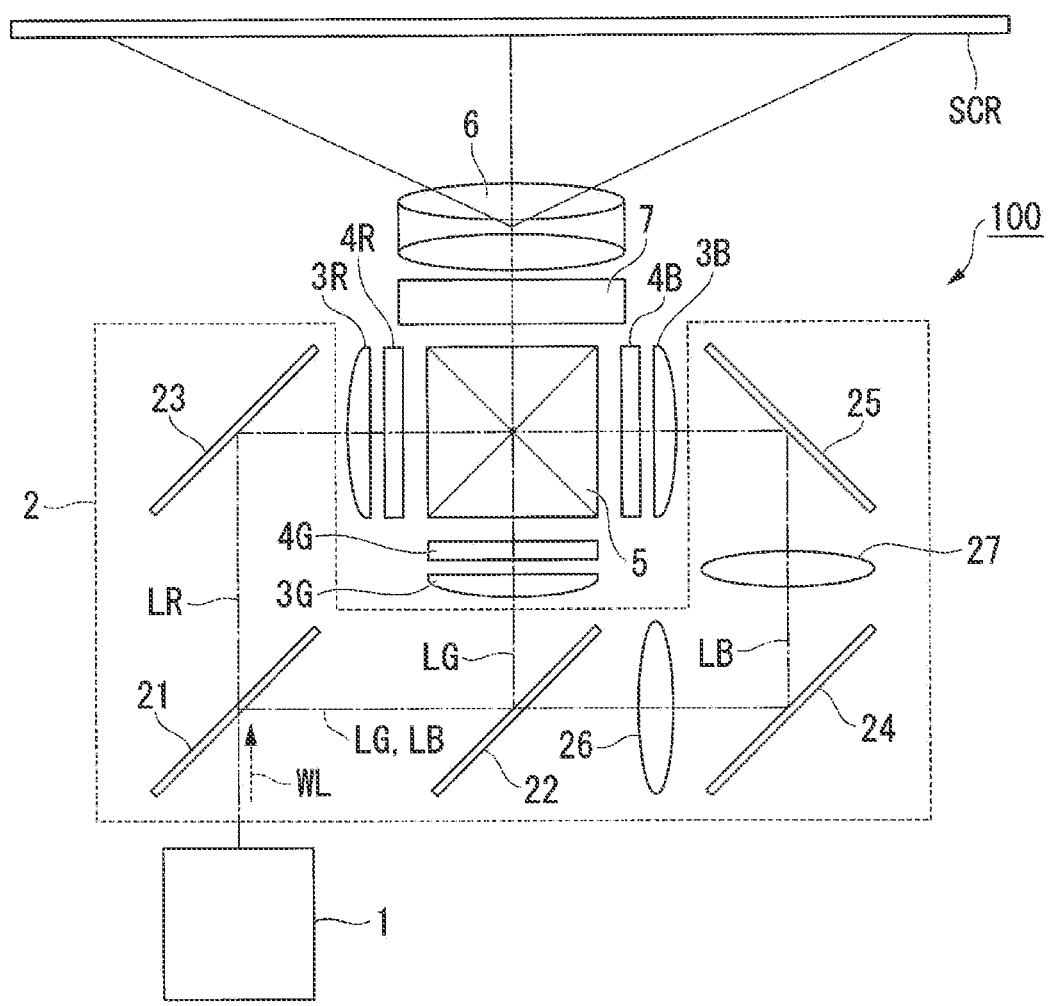
FIG. 1 shows a schematic configuration of a projector according to a first embodiment.

Embodiments of the disclosure will now be described in detail with reference to the drawings.

In the drawings used in the description below, a characteristic part may be enlarged for the sake of convenience of the description in order to facilitate understanding of the feature, and the dimensional proportion of each component is not necessarily the same as reality.

First Embodiment

FIG. 1 shows a schematic configuration of a projector 100 according to this embodiment.

As shown in FIG. 1, the projector 100 according to this embodiment has a light source 1, a color-separation light guiding system 2, a light modulation device for red light (light modulation device) 4R, a light modulation device for green light (light modulation device) 4G, a light modulation device for blue light (light modulation device) 4B, a cross dichroic prism (optical member) 5, a projection system 6, and a shutter unit 7. In the projector 100 according to this embodiment, the light modulation device for red light 4R, the light modulation device for green light 4G, the light modulation device for blue light 4B, and the cross dichroic prism 5 are configured as a unit and thus held by the shutter unit 7.

In this embodiment, the light source 1 emits white illumination light WL including red light LR, green light LG, and blue light LB.

The color-separation light guiding system 2 has a first dichroic mirror 21, a second dichroic mirror 22, a first reflection mirror 23, a second reflection mirror 24, a third reflection mirror 25, a first relay lens 26, and a second relay lens 27. The color-separation light guiding system 2 separates the illumination light WL from the light source 1 into the red light LR, the green light LG, and the blue light LB, guides the red light LR to the light modulation device for red light 4R, guides the green light LG to the light modulation device for green light 4G, and guides the blue light LB to the light modulation device for blue light 4B.

A field lens 3R is arranged between the color-separation light guiding system 2 and the light modulation device for red light 4R. A field lens 3G is arranged between the color-separation light guiding system 2 and the light modulation device for green light 4G. A field lens 3B is arranged between the color-separation light guiding system 2 and the light modulation device for blue light 4B.

The first dichroic mirror 21 transmits the red light LR and reflects the green light LG and the blue light LB. The second dichroic mirror 22 reflects the green light LG and transmits the blue light LB, of the green light LG and the blue light LB reflected by the first dichroic mirror 21. The first reflection mirror 23 reflects the red light LR. The second reflection mirror 24 and the third reflection mirror 25 reflect the blue light LB.

Each of the light modulation device for red light 4R, the light modulation device for green light 4G, and the light modulation device for blue light 4B modulates the incident color light according to image information and thus forms image light. Each of the light modulation device for red light 4R, the light modulation device for green light 4G, and the light modulation device for blue light 4B is formed of a liquid crystal panel.

Although not illustrated, a light incident-side polarizer is arranged between the field lens 3R and the light modulation device for red light 4R. A light incident-side polarizer is arranged between the field lens 3G and the light modulation device for green light 4G. A light incident-side polarizer is arranged between the field lens 3B and the light modulation device for blue light 4B. A light exiting-side polarizer is arranged between the light modulation device for red light 4R and the cross dichroic prism 5. A light exiting-side polarizer is arranged between the light modulation device for green light 4G and the cross dichroic prism 5. A light exiting-side polarizer is arranged between the light modulation device for blue light 4B and the cross dichroic prism 5.

The cross dichroic prism 5 combines together the image light emitted from the light modulation device for red light 4R, the light modulation device for green light 4G, and the light modulation device for blue light 4B, and thus forms a color image. The cross dichroic prism 5 is formed of four right-angle prisms bonded together and is substantially square as viewed in a plan view. A dielectric multilayer film is provided at a substantially X-shaped interface between the bonded right-angle prisms.

The projection system 6 is formed of a projection lens group and projects the image light combined together by the cross dichroic prism 5, in an enlarged manner onto a screen SCR. Thus, an enlarged color image is displayed on the screen SCR.

In the projector 100 according to this embodiment, the shutter unit 7 is arranged between the light exiting surface of the cross dichroic prism 5 and the projection system 6. The shutter unit 7 can block the optical path between the cross dichroic prism 5 and the projection system 6. Specifically, the shutter unit 7 blocks light emitted from the cross dichroic prism 5 to the projection system 6. The shutter unit 7 also blocks external light being incident on the cross dichroic prism 5 via the projection system 6. For example, when the projector 100 according to this embodiment is used at an event venue or the like, there is a risk of a laser beam with a high light intensity being incident on the projection system 6 as external light. In this case, when the laser beam is incident on the light modulation device for red light 4R, the light modulation device for green light 4G, and the light modulation device for blue light 4B via the cross dichroic prism 5, there is a risk of damage to the light modulation device for red light 4R, the light modulation device for green light 4G, and the light modulation device for blue light 4B, such as burnout. To cope with this, in the projector 100 according to this embodiment, the shutter unit 7 blocks the laser beam being incident from the projection system 6. Thus, damage to the light modulation device for red light 4R, the light modulation device for green light 4G, and the light modulation device for blue light 4B can be restrained.

Figure 2:
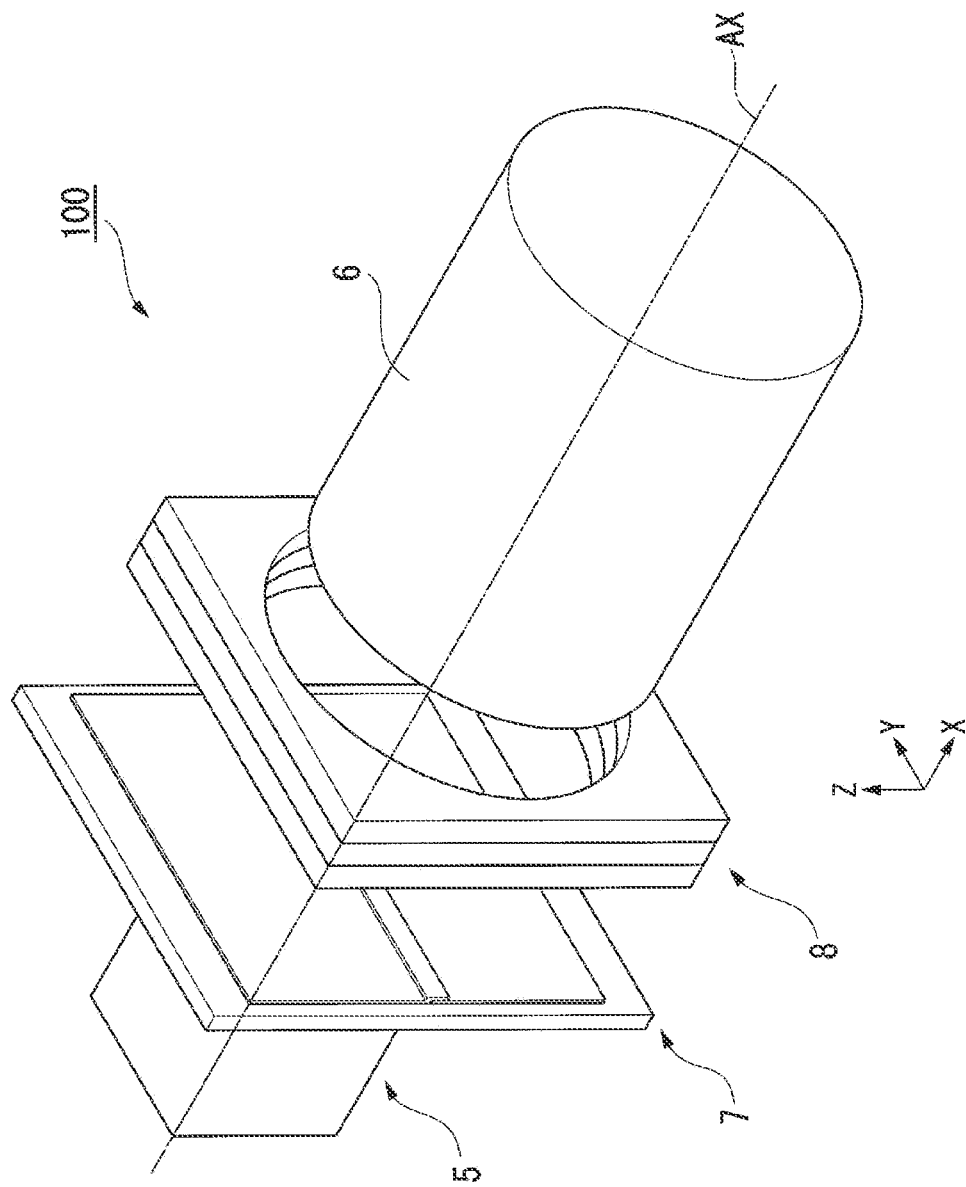
FIG. 2 is an exploded perspective view showing the configuration of an essential part of the projector.

FIG. 2 is an exploded perspective view showing the configuration of an essential part of the projector 100. FIG. 2 shows the configuration of the peripheries of the shutter unit 7 as an essential part of the projector 100. In the drawings used in the description below, an XYZ orthogonal coordinate system is used according to need.

An X-axis is an axis along an optical axis AX of the projection system 6. A Z-axis is an axis orthogonal to the optical axis AX and along an opening/closing direction of the shutter unit 7. A Y-axis is an axis orthogonal to the X-axis and the Z-axis. In this embodiment, a direction along the Z-axis is referred to as "up-down direction", +Z side as "upper side", −Z side as "lower side", a direction along the Y-axis as "left-right direction", +Y side as "right side", and −Y side as "left side". The up-down direction and the left-right direction are simply terms for explaining the positional relationship between individual parts. The actual positional relationship may be different from the positional relationship represented by these terms.

As shown in FIG. 2, the projector 100 according to this embodiment has a lens shift mechanism 8 adjusting the position of the projection system 6. The lens shift mechanism 8 changes the position of the projection system 6 in relation to the cross dichroic prism 5 and thus adjusts the position of an image displayed on the screen SCR. The projector 100 according to this embodiment has the lens shift mechanism 8 and therefore can display an image at a desired position on the screen SCR.

Figure 3:
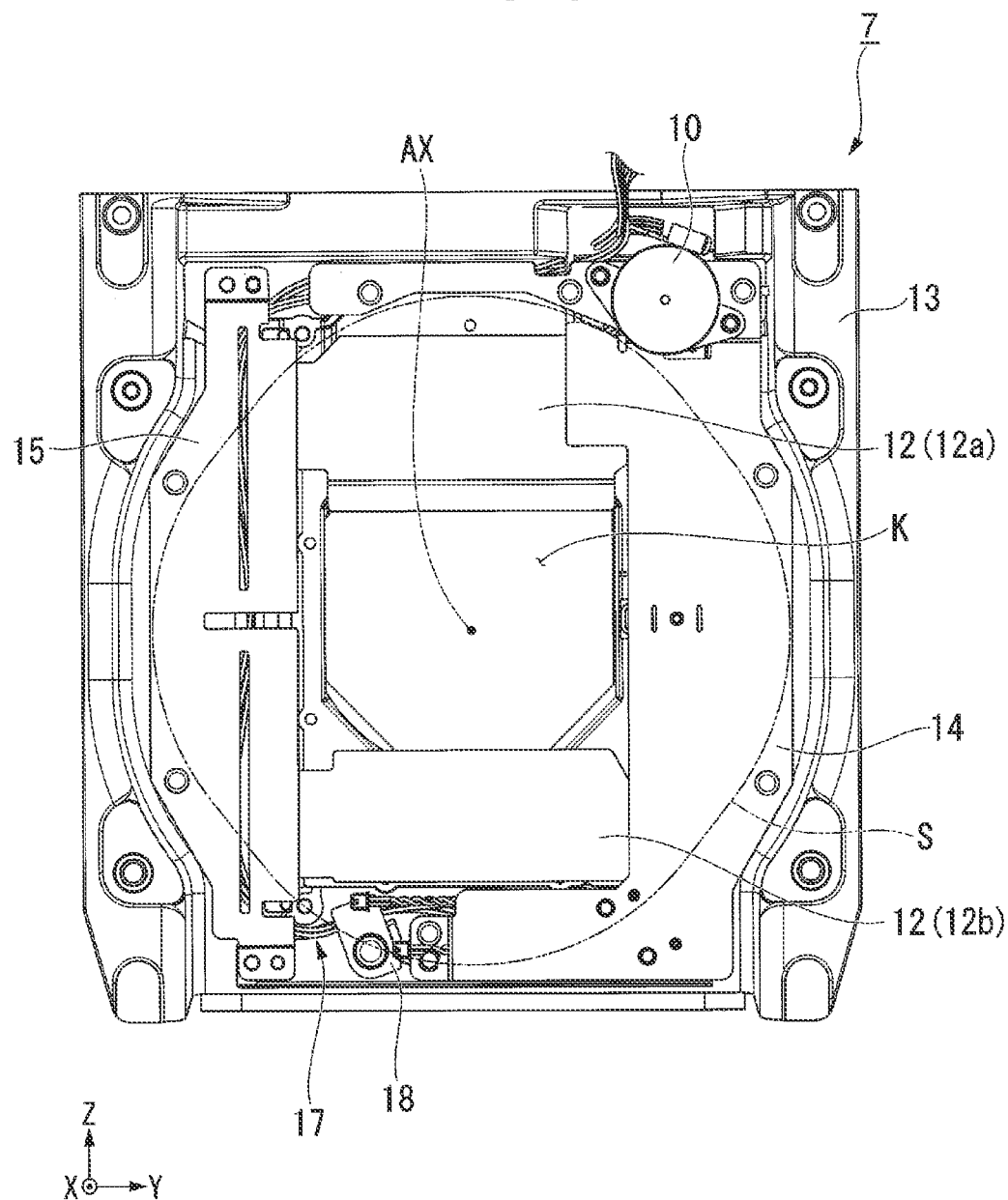
FIG. 3 is a plan view of a shutter unit as viewed from the +X side.
Figure 4:
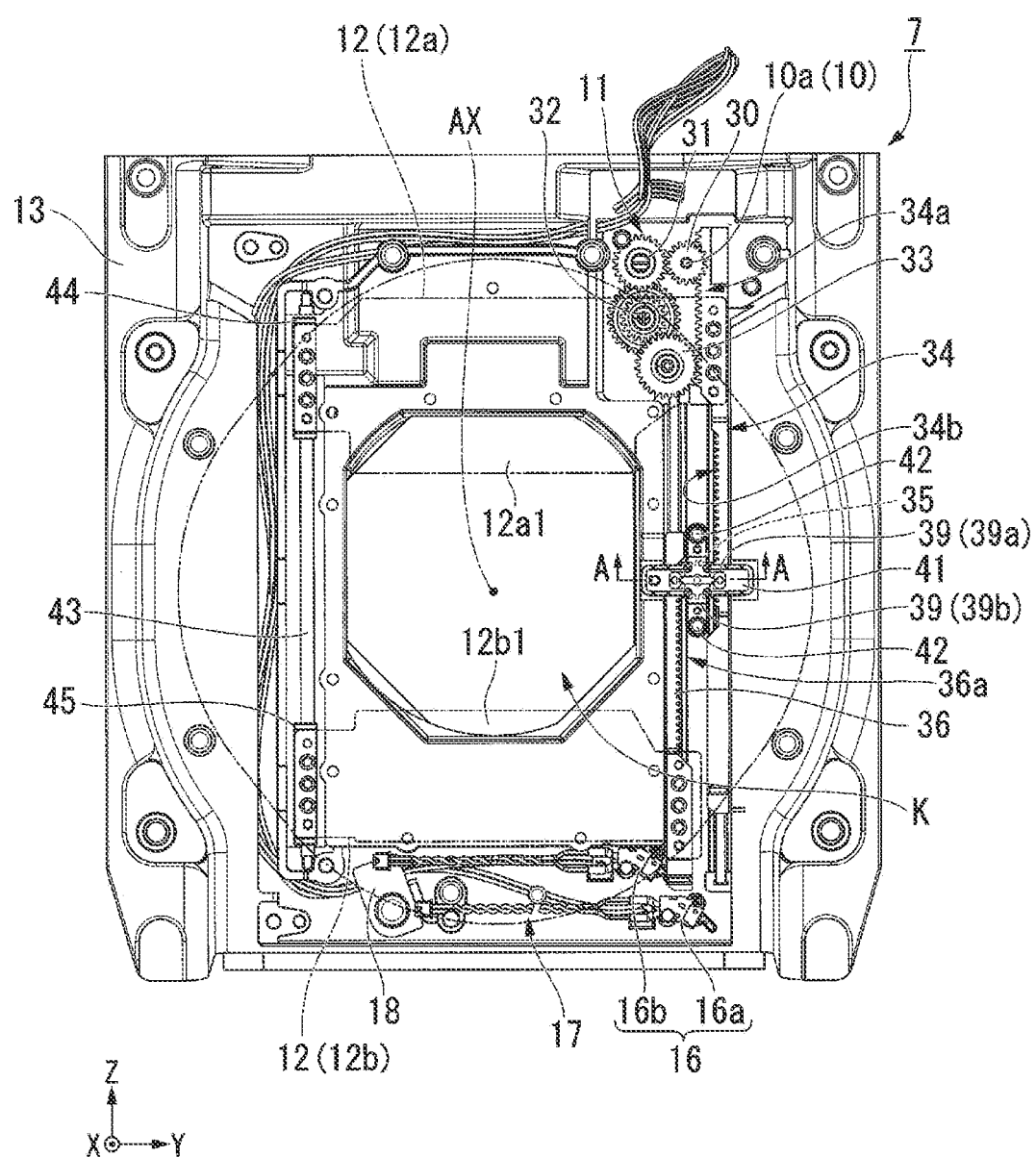
FIG. 4 shows the internal configuration of the shutter unit.

FIG. 3 is a plan view of the shutter unit 7 as viewed from the +X side. FIG. 4 shows the internal configuration of the shutter unit 7. In FIG. 4, in order to make the illustration easier to understand, some components of the shutter unit 7 are omitted and the state where the shutter member is opened is shown.

As shown in FIGS. 3 and 4, the shutter unit 7 has a drive motor 10, a transmission member 11 transmitting a rotational drive force of the drive motor 10, a shutter member 12 that is arranged on the optical path of light emitted from the cross dichroic prism 5 and that moves, linked with the movement of the transmission member 11, a casing part 13, a first metal plate member 14, a second metal plate member 15, and a switch member 16.

The casing part 13 holds the drive motor 10, the transmission member 11, the shutter member 12, the first metal plate member 14, and the second metal plate member 15. The casing part 13 has an opening K through which light emitted from the cross dichroic prism 5 and being incident on the projection system 6 passes. The casing part 13 also functions as a holding member holding the cross dichroic prism 5 and the lens shift mechanism 8.

The first metal plate member 14 and the second metal plate member 15 are attached to the casing part 13 in such a way as to cover a wiring 17 drawn out from the transmission member 11, the shutter member 12, and the switch member 16. In a space between the first metal plate member 14 and the second metal plate member 15, the wiring 17 is fixed to the casing part 13 via a clip member 18. Thus, the wiring 17 is restrained from floating and interference between the wiring 17, the projection system 6 and the wiring 17 is avoided. Therefore, the occurrence of an inconvenience such as disconnection or short circuit can be restrained.

The first metal plate member 14 is provided on the right side of the casing part 13. The second metal plate member 15 is provided on the left side of the casing part 13. The first metal plate member 14 also functions as a support plate supporting the drive motor 10.

In the projector 100 according to this embodiment, the lens shift mechanism 8 enables the projection system 6 to move, as described above. As shown in FIG. 3, the projection system 6 moves within a lens movement area S in relation to the shutter unit 7. The optical axis AX of the projection system 6 moves within the lens movement area S.

In this embodiment, the lens movement area S is an area that can face the projection system 6 moving via the lens shift mechanism 8, that is, a facing area facing the projection system 6.

The shutter member 12 is provided in the facing area facing the projection system 6, that is, the lens movement area S. The opening K in the casing part 13 is located in the lens movement area S. The shutter member 12 is provided in the casing part 13 in such a way as to be able to shield the opening K. Even when the position of the projection system 6 is moved by the lens shift mechanism 8, the shutter member 12 can block the optical path of light emitted from the cross dichroic prism 5 and being incident on the projection system 6.

The drive motor 10 generates a drive force driving the shutter member 12. In the shutter unit 7 in this embodiment, the drive motor 10 is provided outside the lens movement area S, that is, outside the facing area facing the projection system 6. The drive motor 10 has a rotary shaft 10*a* rotating about an axis along the X-axis.

As shown in FIG. 4, the transmission member 11 has a pinion gear (first engagement member) 30, a first gear (second engagement member) 31, a second gear (second engagement member) 32, third gear (second engagement member) 33, a first moving member 34, a fourth gear (third engagement member) 35, and a second moving member 36. In the shutter unit 7 in this embodiment, at least a part of the transmission member 11 is provided facing the lens movement area (facing area).

The pinion gear 30 is provided on the rotary shaft 10*a* of the drive motor 10. The first gear 31 engages with the pinion gear 30. The second gear 32 engages with the first gear 31 and the third gear 33 and transmits a drive force of the first gear 31 to the third gear 33. The third gear 33 engages with the first moving member 34. Specifically, the first moving member 34 has a first rack part (first engagement part) 34*a* and a second rack part (second engagement part) 34*b*.

The first rack part 34*a* is provided on the upper side of the first moving member 34. The second rack part 34*b* is provided at a center part of the first moving member 34. The first rack part 34*a* engages with the third gear 33. The second rack part 34*b* engages with the fourth gear 35. The first moving member 34 is a plate-like member extending along the Z-axis direction.

The second moving member 36 has a third rack part (third engagement part) 36*a*. The third rack part 36*a* engages with the fourth gear 35. The second moving member 36 is a plate-like member extending along the Z-axis direction. The first moving member 34 and the second moving member 36 are arranged facing each other via the fourth gear 35.

The second rack part 34*b* of the first moving member 34 and the third rack part 36*a* of the second moving member 36 are coupled together by the fourth gear 35. Thus, a drive force of the first moving member 34 is transmitted to the second moving member 36.

The shutter member 12 has a first shutter 12*a* and a second shutter 12*b*. The first shutter 12*a* and the second shutter 12*b* are plate-like members extending in the left-right direction. Since the shutter member 12 in this embodiment is formed of the two shutters 12*a*, 12*b*, the device configuration can be miniaturized, compared with a configuration where a single shutter is moved to block the optical path.

The right side of the first shutter 12*a* is fixed to the upper end side of the first moving member 34 and moves, linked to the movement of the first moving member 34. The right side of the second shutter 12*b* is fixed to the lower end side of the second moving member 36 and moves, linked to the movement of the second moving member 36.

Figure 7:
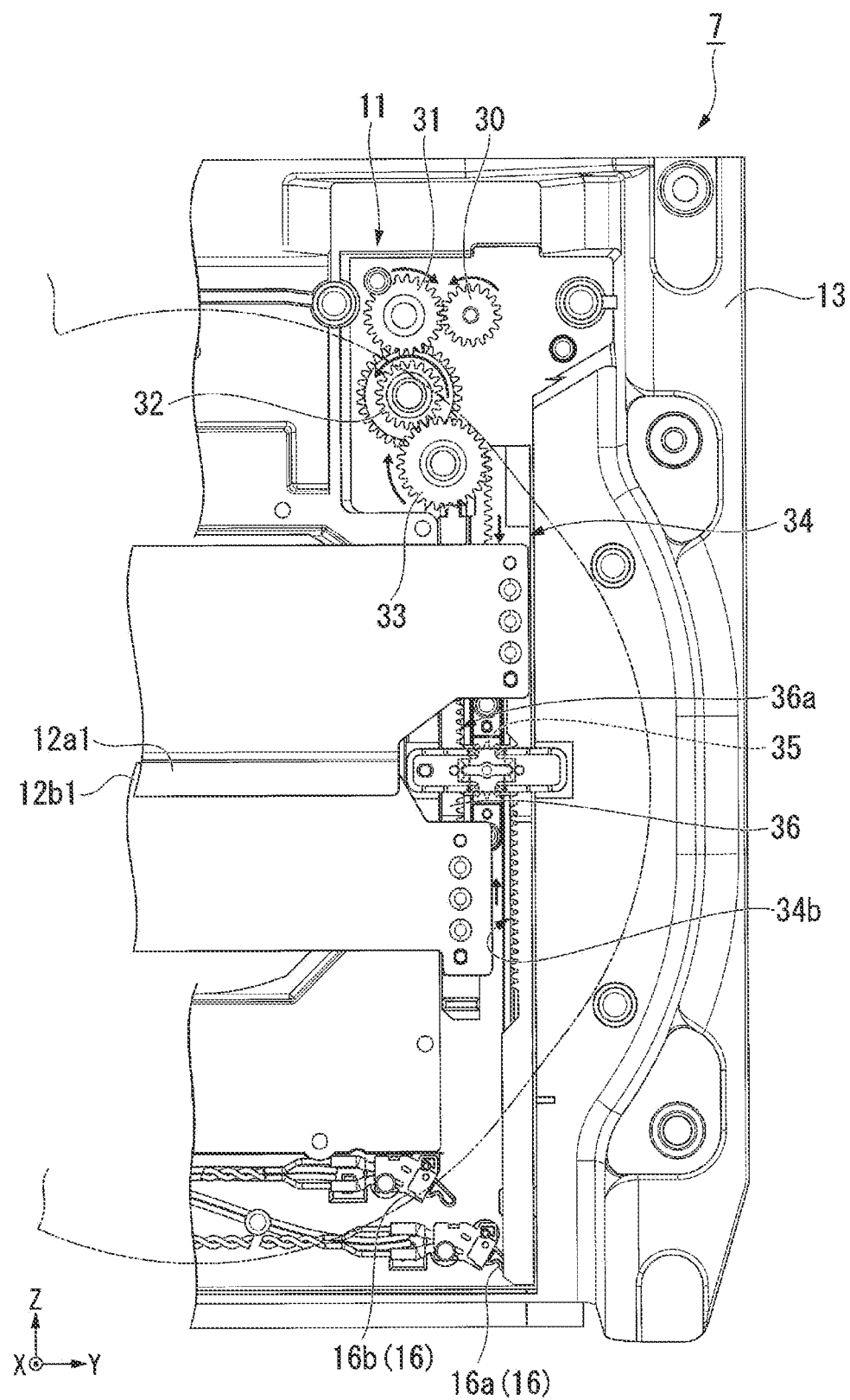
FIG. 7 explains an operation of closing the shutter member.

When blocking the optical path, the shutter member 12 is arranged in such a way that a part of a lower end part 12*a*1 of the first shutter 12*a* and a part of an upper end part 12*b*1 of the second shutter 12*b* are laid on top of each other (see FIG. 7). Light leakage from a space between the first shutter 12*a* and the second shutter 12*b* is restrained. Thus, the shutter member 12 can block the optical path without generating light leakage.

The shutter unit 7 in this embodiment has the switch member 16 detecting the opening/closing state of the shutter member 12. The switch member 16 includes a first switch 16*a* and a second switch 16*b*.

The first switch 16*a* is a switch detecting the state where the shutter member 12 has completely closed the optical path. The second switch 16*b* is a switch detecting the state where the shutter member 12 has opened the optical path. The first switch 16*a* and the second switch 16*b* are formed, for example, of a mechanical switch. The wiring 17 drawn out from the first switch 16*a* and the second switch 16*b* is laid out inside the casing part 13 in such a way as not to obstruct the operation of the shutter member 12. The operation of the first switch 16*a* and the second switch 16*b* will be described later.

In the shutter unit 7 in this embodiment, the first gear 31, the second gear 32, the third gear 33, the first rack part 34*a* and the second rack part 34*b* of the first moving member 34, the fourth gear 35, and the third rack part 36*a* of the second moving member 36, which are components of the transmission member 11, are arranged in such a way that the direction of the thickness of each of these components is laid along the optical axis AX of the projection system 6. That is, in the shutter unit 7 in this embodiment, the components of the transmission member 11 are arranged along a YZ plane orthogonal to the optical axis AX of the projection system 6.

In the shutter unit 7 in this embodiment, the drive motor 10 is provided outside the lens movement area (facing area) S as described above. Thus, the shutter unit 7 can avoid interference between the projection system 6 and the drive motor 10.

In the shutter unit 7 in this embodiment, the drive motor 10 having a relatively large volume among the components of the shutter unit 7 is arranged outside the lens movement area S facing the projection system 6, and at least a part of the transmission member 11, which is another component of the shutter unit 7, is arranged facing the lens movement area S.

Thus, the dimension of the shutter unit 7 in this embodiment in the X-axis direction along the optical axis AX of the projection system 6 is restrained. Therefore, even when the space between the cross dichroic prism 5 and the projection system 6 is relatively narrow, the shutter unit 7 can be arranged in this space.

Figure 5:
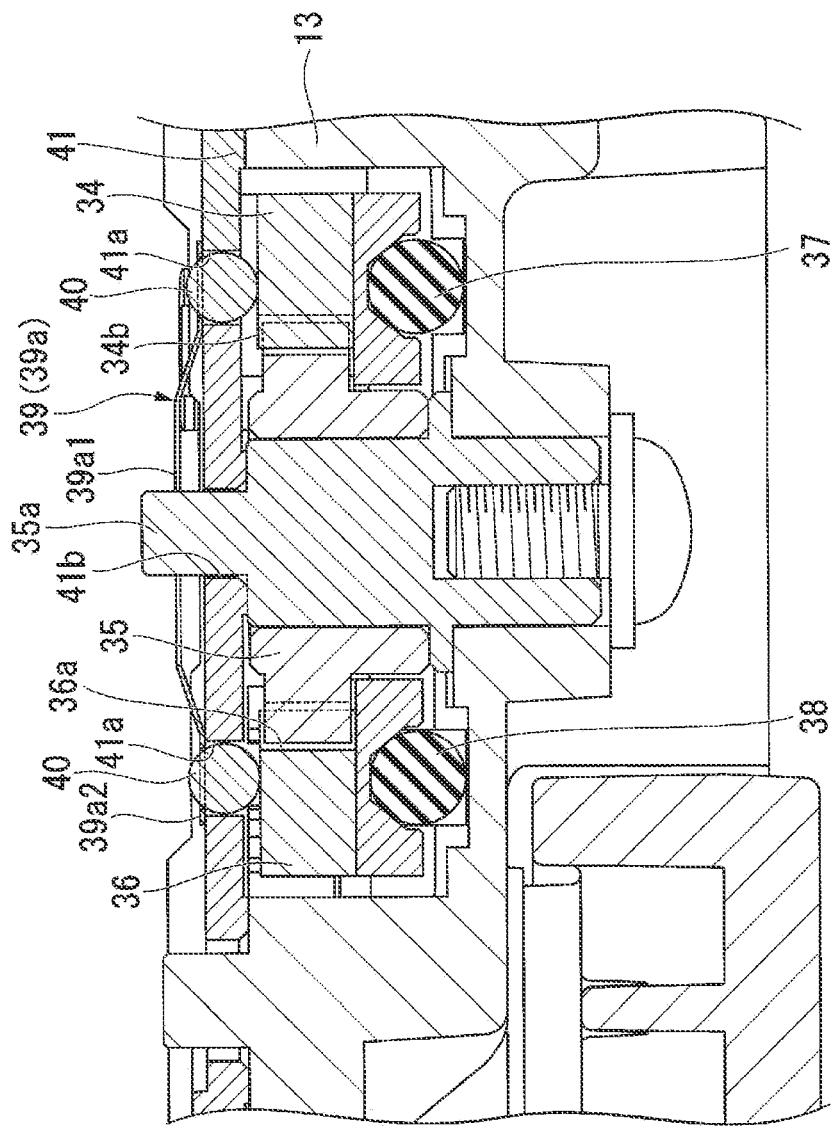
FIG. 5 is a cross-sectional view of an essential part of the shutter unit, taken in the direction of arrows on A-A in FIG. 4.

FIG. 5 shows the cross-sectional configuration of an essential part of the shutter unit 7, taken in the direction of arrows on A-A in FIG. 4.

As shown in FIG. 5, the transmission member 11 in this embodiment also has a first rail 37, a second rail 38, a leaf spring 39, a ball member 40, and a support plate 41. The first rail 37 guides the first moving member 34 slidably in the Z-axis direction. The second rail 38 guides the second moving member 36 slidably in the Z-axis direction.

The ball member 40 is arranged between each of the first moving member 34 and the second moving member 36, and the leaf spring 39. The support plate 41 is provided in such a way as to bridge over the section between the first moving member 34 and the second moving member 36. The ball member 40 is arranged in a first penetration hole 41a provided in the support plate 41. A rotary shaft 35a of the fourth gear 35 is inserted in a second penetration hole 41b provided in the support plate 41. The support plate 41 together with the casing part 13 rotatably supports the fourth gear 35.

As shown in FIG. 4, the leaf spring 39 has a pressing part 39a extending in such a way as to bridge over the section between the first moving member 34 and the second moving member 36, and an attachment part 39b extending in a direction orthogonal to the pressing part 39a. The pressing part 39a has an opening 39a1 provided at the center and a ball holding part 39a2 provided at both ends.

As shown in FIG. 5, the pressing part 39a is provided in such a way as to cover the support plate 41 from above, in the state where the rotary shaft 35a of the fourth gear 35 is inserted in the opening 39a1. The ball member 40 held in the first penetration hole 41a in the support plate 41 is pressed by the ball holding part 39a2 of the pressing part 39a. The pressing part 39a of the leaf spring 39 presses the first moving member 34 and the second moving member 36 against the first rail 37 and the second rail 38 via the ball member 40. The ball member 40 pressed by the ball holding part 39a2 is rotatably held in the first penetration hole 41a in the support plate 41.

As shown in FIG. 4, the leaf spring 39 has the attachment part 39b fixed to the casing part 13 with a screw member 42 and thereby presses the first moving member 34 and the second moving member 36 against the first rail 37 and the second rail 38 as described above. Thus, the first moving member 34 and the second moving member 36 are restrained from wobbling on the first rail 37 and the second rail 38.

Since the leaf spring 39 in this embodiment presses the first moving member 34 and the second moving member 36 against the first rail 37 and the second rail 38 via the rotatably held ball member 40, the rotation of the ball member 40 reduces the frictional resistance generated when the first moving member 34 and the second moving member 36 slide. Therefore, the first moving member 34 and the second moving member 36 can smoothly slide on the first rail 37 and the second rail 38. The drive force of the drive motor 10 is thus restrained.

As shown in FIG. 4, the shutter unit 7 in this embodiment also has a fourth rail 43, a first slider member 44, and a second slider member 45. The fourth rail 43 allows the first slider member 44 and the second slider member 45 to slide in the up-down direction along the Z-axis. The first slider member 44 is fixed to the left side of the first shutter 12a. The second slider member 45 is fixed to the left side of the second shutter 12b.

The first slider member 44 supports the left side of the first shutter 12a moving in the up-down direction and guide the movement of the first shutter 12a in the up-down direction along the fourth rail 43. In the shutter unit 7 in this embodiment, the movement of the first shutter 12a is guided on both sides in the left-right direction. Therefore, the wobbling of the first shutter 12a during the movement can be reduced.

The second slider member 45 supports the left side of the second shutter 12b moving in the up-down direction and guides the movement of the second shutter 12b in the up-down direction along the fourth rail 43. In the shutter unit 7 in this embodiment, the movement of the second shutter 12b is guided on both sides in the left-right direction. Therefore, the wobbling of the second shutter 12b during the movement can be reduced.

The first slider member 44 and the second slider member 45 are held down from the +X side by the second metal plate member 15 shown in FIG. 3. Thus, the first slider member 44 and the second slider member 45 are restrained from floating up from the fourth rail 43. Therefore, the first slider member 44 and the second slider member 45 are restrained from wobbling.

Since the second metal plate member 15 has a predetermined spring elasticity, an appropriate space is held between the first slider member 44 and the second slider member 45, and the fourth rail 43. Therefore, the second metal plate member 15 can reduce the frictional resistance generated when the first slider member 44 and the second slider member 45 slide, while restraining the wobbling thereof.

Figure 6:
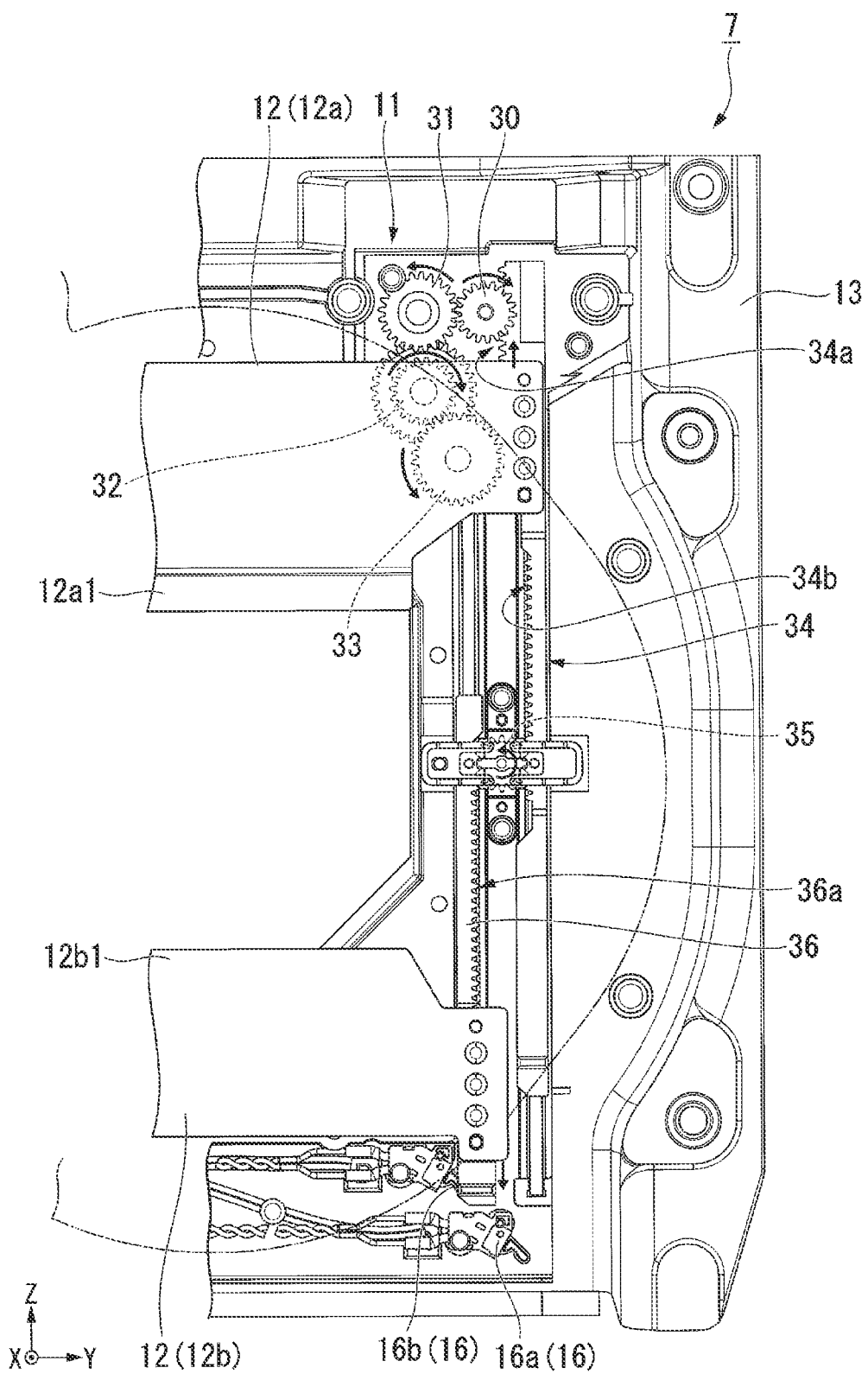
FIG. 6 explains an operation of opening a shutter member.

Operations of the shutter unit 7 will now be described. FIG. 6 explains an operation of opening the shutter member 12 in the shutter unit 7. FIG. 7 explains an operation of closing the shutter member 12 in the shutter unit 7. FIG. 6 corresponds to the case where the direction of rotation of the drive motor 10 is "clockwise" as viewed from the +X side. FIG. 7 corresponds to the case where the direction of rotation of the drive motor 10 is "counterclockwise" as viewed from the +X side.

As shown in FIG. 6, a drive force of the pinion gear 30 rotated clockwise by the drive motor 10 is transmitted to the third gear 33 via the first gear 31 and the second gear 32. The third gear 33 rotates counterclockwise, which is the opposite to the rotation of the pinion gear 30. As the third gear 33 rotates counterclockwise, the first rack part 34a is pulled up. Thus, the first moving member 34 moves upward. At this time, the first shutter 12a fixed to the first moving member 34 moves upward, linked to the movement of the first moving member 34. The first shutter 12a moves in the direction of opening the optical path.

Also, the second rack part 34b provided in the first moving member 34 moves upward. As the second rack part 34b moves upward, the fourth gear 35 engaging with the second rack part 34b rotates counterclockwise. As the fourth gear 35 rotates counterclockwise, the third rack part 36a is pulled down. Thus, the second moving member 36 moves downward. At this time, the second shutter 12b fixed to the second moving member 36 moves downward, linked to the movement of the second moving member 36. The second shutter 12b moves in the direction of opening the optical path.

In the shutter unit 7 in this embodiment, the drive motor 10 rotates the pinion gear 30 clockwise, as shown in FIG. 6, and this rotation can move the first shutter 12a upward and move the second shutter 12b downward.

In the shutter unit 7, when the first shutter 12a and the second shutter 12b move to a position that completely opens the optical path, a lower end part of the second moving member 36 comes into contact with the second switch 16b of the switch member 16. The shutter unit 7 in this embodiment can detect, by the second switch 16b, that the first shutter 12a and the second shutter 12b have moved to the position that completely opens the optical path. When the second moving member 36 is detected by the second switch 16b, the shutter unit 7 stops the rotation of the drive motor 10.

In this way, the shutter unit 7 can open the optical path between the cross dichroic prism 5 and the projection system 6.

As shown in FIG. 7, a drive force of the pinion gear 30 rotated counterclockwise by the drive motor 10 is transmitted to the third gear 33 via the first gear 31 and the second gear 32. The third gear 33 rotates clockwise, which is the opposite to the rotation of the pinion gear 30. As the third gear 33 rotates clockwise, the first rack part 34a is pulled down. Thus, the first moving member 34 moves downward. At this time, the first shutter 12a fixed to the first moving member 34 moves downward, linked to the movement of the first moving member 34. The first shutter 12a moves in the direction of closing the optical path.

Also, the second rack part 34b provided in the first moving member 34 moves downward. As the second rack part 34b moves downward, the fourth gear 35 engaging with the second rack part 34b rotates clockwise. As the fourth gear 35 rotates clockwise, the third rack part 36a is pulled up. Thus, the second moving member 36 moves upward. At this time, the second shutter 12b fixed to the second moving member 36 moves upward, linked to the movement of the second moving member 36. The second shutter 12b moves in the direction of closing the optical path.

In the shutter unit 7 in this embodiment, the drive motor 10 rotates the pinion gear 30 counterclockwise, as shown in FIG. 7, and this rotation can move the first shutter 12a downward and move the second shutter 12b upward.

In the shutter unit 7, when the first shutter 12a and the second shutter 12b move to a position that completely closes the optical path, a lower end part of the first moving member 34 comes into contact with the first switch 16a of the switch member 16. The shutter unit 7 in this embodiment can detect, by the first switch 16a, that the first shutter 12a and the second shutter 12b have moved to the position that completely closes the optical path. When the first moving member 34 is detected by the first switch 16a, the shutter unit 7 stops the rotation of the drive motor 10.

In this way, the shutter unit 7 can close the optical path between the cross dichroic prism 5 and the projection system 6.

Thus, the shutter unit 7 can block the optical path between the cross dichroic prism 5 and the projection system 6.

Also, for example, even when the projector 100 according to this embodiment is used at an event venue or the like and a laser beam with a high light intensity is incident on the projection system 6 as external light, the shutter unit 7 can block the laser beam heading toward the cross dichroic prism 5 via the projection system 6. Thus, the problem of the laser beam damaging the light modulation device for red light 4R, the light modulation device for green light 4G, and the light modulation device for blue light 4B can be solved.

Effects of First Embodiment

The projector 100 according to this embodiment has the following effects.

The projector 100 according to this embodiment has the light source 1, the light modulation devices 4R, 4G, and 4B modulating light emitted from the light source 1 according to image information and thus forming image light, the projection system 6 projecting the light modulated by the light modulation devices 4R, 4G, and 4B onto the screen SCR, the cross dichroic prism 5 guiding the light from the light modulation devices 4R, 4G, and 4B to the projection system 6, and the shutter unit 7, which is arranged between the cross dichroic prism 5 and the projection system 6 and can block the optical path between the cross dichroic prism 5 and the projection system 6. The shutter unit 7 has the drive motor 10, the transmission member 11 transmitting the rotational drive force of the drive motor 10, and the shutter member 12, which is arranged on the optical path of the light emitted from the cross dichroic prism 5 and which moves, linked to the movement of the transmission member 11. The shutter member 12 is provided facing the lens movement area S facing the projection system 6. At least a part of the transmission member 11 is provided facing the lens movement area S. The drive motor 10 is provided outside the lens movement area S.

In the projector 100 according to this embodiment, the drive motor 10 having a relatively large volume among the components of the shutter unit 7 is arranged outside the lens movement area S, and at least a part of the transmission member 11, which is another component of the shutter unit 7, is arranged facing the lens movement area S. Thus, the dimension in the X-axis direction along the optical axis AX of the projection system 6 is restrained. Therefore, even when the space between the cross dichroic prism 5 and the projection system 6 is relatively narrow, the shutter unit 7 according to this embodiment can be arranged in this space.

Therefore, the projector 100 according to this embodiment can be miniaturized by reducing the space between the cross dichroic prism 5 and the projection system 6 for arranging the shutter unit 7.

Also, in the projector 100 according to this embodiment, the drive motor 10 has the rotary shaft 10a, and the transmission member 11 has the pinion gear 30 provided on the rotary shaft 10a, the first gear 31 engaging with the pinion gear 30 and thus having the rotational drive force transmitted thereto, and the first moving member 34 having the first rack part 34a engaging with the first gear 31 and thus having the rotational drive force transmitted thereto. The shutter member 12 moves, linked to the movement of the first moving member 34. The second gear 32 and the first rack part 34a are arranged in such a way that the direction of the thickness of each of these parts is laid along the direction of the optical axis AX of the projection system 6.

According to this configuration, when the components of the transmission member 11 are arranged along the YZ plane, the dimension in the direction of the optical axis AX of the components of the transmission member 11 can be minimized. Thus, in the shutter unit 7, the size of the transmission member 11 in the direction of the optical axis AX can be restrained.

In the projector 100 according to this embodiment, the shutter member 12 has the first shutter 12a and the second shutter 12b. The first moving member 34 has the second rack part 34b. The transmission member 11 also has the fourth gear 35 engaging with the second rack part 34b, and the second moving member 36 having the third rack part 36a engaging with the fourth gear 35 and thus having the rotational drive force transmitted thereto. The first shutter 12a is fixed to the first moving member 34 and moves, linked to the movement of the first moving member 34. The second shutter 12b is fixed to the second moving member 36 and moves, linked to the movement of the second moving member 36.

According to this configuration, as the drive motor 10 rotates the pinion gear 30, the first moving member 34 and the second moving member 36 move and thus can open and close the first shutter 12a and the second shutter 12b.

In the projector 100 according to this embodiment, the transmission member 11 also has the first rail 37 slidably guiding the first moving member 34, the second rail 38 slidably guiding the second moving member 36, the leaf spring 39 pressing the first moving member 34 and the second moving member 36 against the first rail 37 and the second rail 38, and the ball member 40 arranged between each of the first moving member 34 and the second moving member 36, and the leaf spring 39.

According to this configuration, the leaf spring 39 pressing the first moving member 34 and the second moving member 36 against the first rail 37 and the second rail 38 via the rotatably held ball member 40 is provided. Therefore, the rotation of the ball member 40 reduces the frictional resistance generated when the first moving member 34 and the second moving member 36 slide. Therefore, the first moving member 34 and the second moving member 36 can smoothly slide on the first rail 37 and the second rail 38. The drive force of the drive motor 10 is thus restrained.

Second Embodiment

A second embodiment of the disclosure will now be described. The difference between the projector according to this embodiment and the projector according to the first embodiment is the configuration of the shutter unit. Therefore, the configuration of the shutter unit is described below and description of the other same configurations is omitted. The same configurations and members as in the first embodiment are denoted by the same reference signs and detailed description thereof is omitted.

Figure 8:
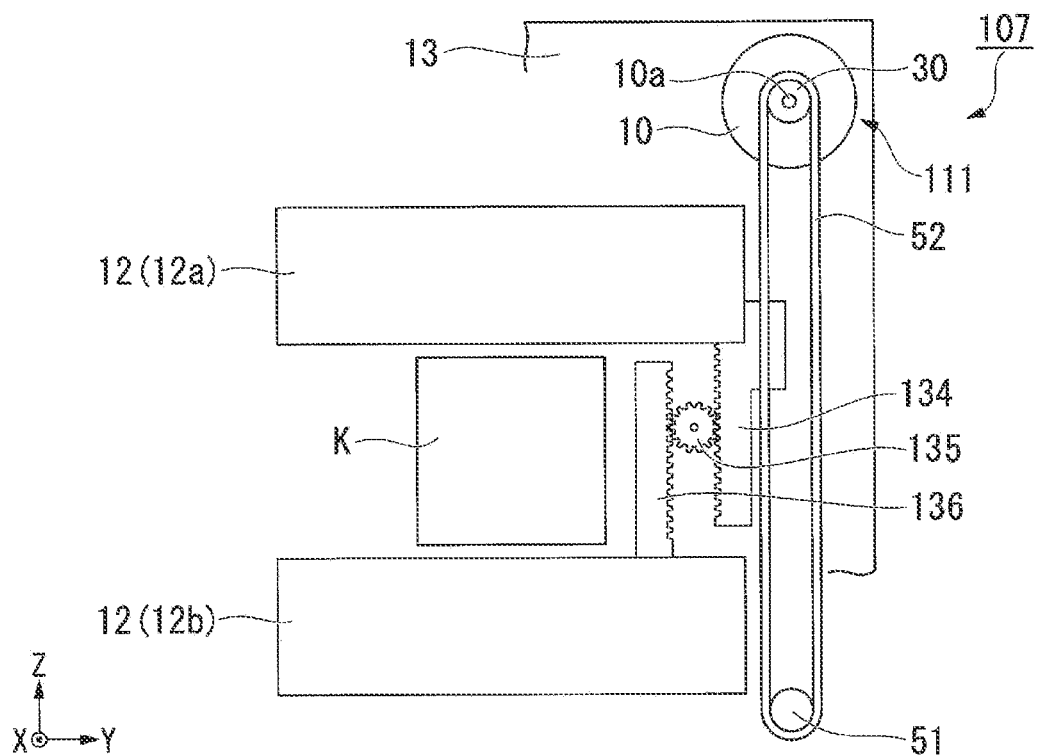
FIG. 8 shows the internal configuration of a shutter unit according to a second embodiment.

FIG. 8 shows the internal configuration of a shutter unit 107 according to this embodiment. FIG. 8 is an illustration corresponding to FIG. 4 in the first embodiment and is a schematic view from which members that are not used for the explanation are omitted.

As shown in FIG. 8, the shutter unit 107 in this embodiment has a transmission member 111, the shutter member 12, and the casing part 13.

The transmission member 111 in this embodiment has the pinion gear 30, a pulley 51, a belt member 52, a first rack member 134, a gear 135, and a second rack member 136. The first rack member 134 and the second rack member 136 are movable in the Z-axis direction along a rail member (not illustrated).

The belt member 52 is laid between and around the pinion gear 30 provided on the rotary shaft 10a of the drive motor 10, and the pulley 51. The belt member 52 is fixed to the first rack member 134.

The first rack member 134 and the second rack member 136 are arranged facing each other via the gear 135. The first rack member 134 engages with the gear 135. The second rack member 136 engages with the gear 135. Thus, a drive force of the first rack member 134 is transmitted to the second rack member 136. The first rack member 134 and the second rack member 136 are movable in the Z-axis direction along a rail member (not illustrated).

The first shutter 12a is fixed to the first rack member 134 and moves, linked to the movement of the first rack member 134. The second shutter 12b is fixed to the second rack member 136 and moves, linked to the movement of the second rack member 136.

Figure 9A:
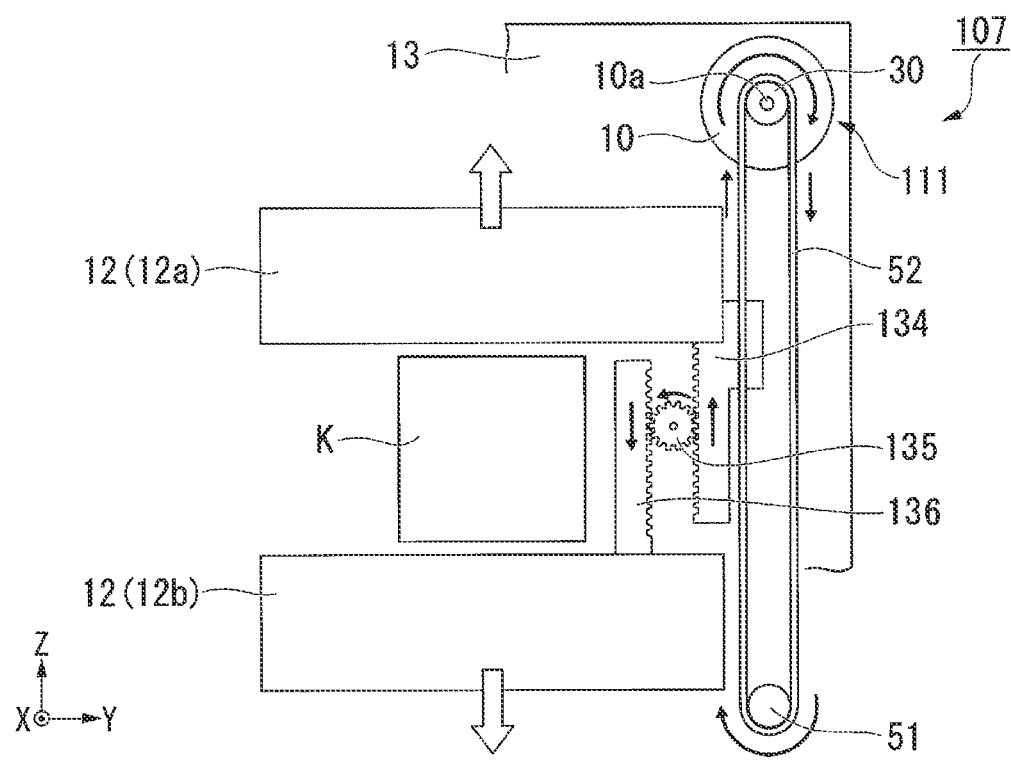
FIG. 9A explains an operation of opening a shutter member.
Figure 9B:
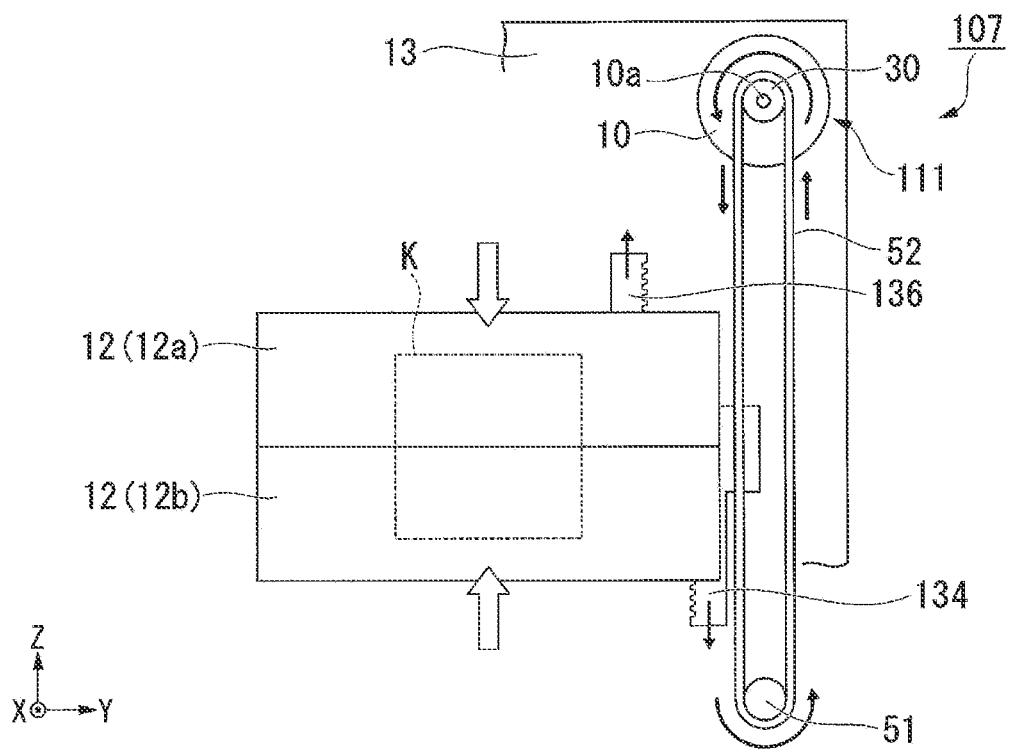
FIG. 9B explains an operation of closing the shutter member.

Operations of the shutter unit 107 in this embodiment will now be described. FIG. 9A explains an operation of opening the shutter member 12 in the shutter unit 107. FIG. 9B explains an operation of closing the shutter member 12 in the shutter unit 107.

In the shutter unit 107 in this embodiment, as shown in FIG. 9A, when the pinion gear 30 is rotated clockwise by the drive motor 10, the belt member 52 turns clockwise with the pinion gear 30. Thus, the first rack member 134 moves upward with the belt member 52. At this time, the first shutter 12a fixed to the first rack member 134 moves upward, linked to the movement of the first rack member 134. The first shutter 12a moves in the direction of opening the optical path.

As the first rack member 134 moves upward, the gear 135 engaging with the first rack member 134 rotates counterclockwise. As the gear 135 rotates counterclockwise, the second rack member 136 is pulled down. At this time, the second shutter 12b fixed to the second rack member 136 moves downward, linked to the movement of the second rack member 136. The second shutter 12b moves in the direction of opening the optical path.

In the shutter unit 107 in this embodiment, the drive motor 10 rotates the pinion gear 30 clockwise, and this rotation can move the first shutter 12a upward and move the second shutter 12b downward, achieving the state where the optical path is opened.

Meanwhile, in the shutter unit 107 in this embodiment, as shown in FIG. 9B, when the drive motor 10 rotates the pinion gear 30 counterclockwise, the belt member 52 turns counterclockwise with the pinion gear 30. Thus, the first rack member 134 moves downward with the belt member 52. At this time, the first shutter 12a fixed to the first rack member 134 moves downward, linked to the movement of the first rack member 134. The first shutter 12a moves in the direction of closing the optical path.

As the first rack member 134 moves downward, the gear 135 engaging with the first rack member 134 rotates clockwise. As the gear 135 rotates clockwise, the second rack member 136 is pulled up. At this time, the second shutter 12b fixed to the second rack member 136 moves upward, linked to the movement of the second rack member 136. The second shutter 12b moves in the direction of closing the optical path.

In the shutter unit 107 in this embodiment, the drive motor 10 rotates the pinion gear 30 counterclockwise, and this rotation can move the first shutter 12a downward and move the second shutter 12b upward, achieving the state where the optical path is closed.

In the shutter unit 107 in this embodiment, the pinion gear 30, the pulley 51, the belt member 52, the first rack member 134, the gear 135, and the second rack member 136, which are components of the transmission member 111, are arranged in such a way that the direction of the thickness of each of these parts is laid along the optical axis AX of the projection system 6.

In the shutter unit 107 in this embodiment, too, the components of the transmission member 111 are arranged along the YZ plane orthogonal to the optical axis AX of the projection system 6. When the components of the transmission member 111 are arranged along the YZ plane in this way, the dimension in the direction of the optical axis AX of the components of the transmission member 111 can be minimized. Thus, the size of the transmission member 111 in the direction of the optical axis AX can be restrained.

Effects of Second Embodiment

The shutter unit 107 in this embodiment has the following effects.

In the shutter unit 107 in this embodiment, the drive motor 10 having a relatively large volume among the components is arranged outside the lens movement area, and at least a part of the transmission member 111, which is another component, is arranged facing the lens movement area. Therefore, even when the space between the cross dichroic prism 5 and the projection system 6 is relatively narrow, the shutter unit 107 can be arranged in this space.

Thus, the projector having the shutter unit 107 in this embodiment can be miniaturized.

The disclosure is not limited to the contents of the foregoing embodiments and can be suitably changed without departing from the spirit and scope of the disclosure.

Figure 10A:
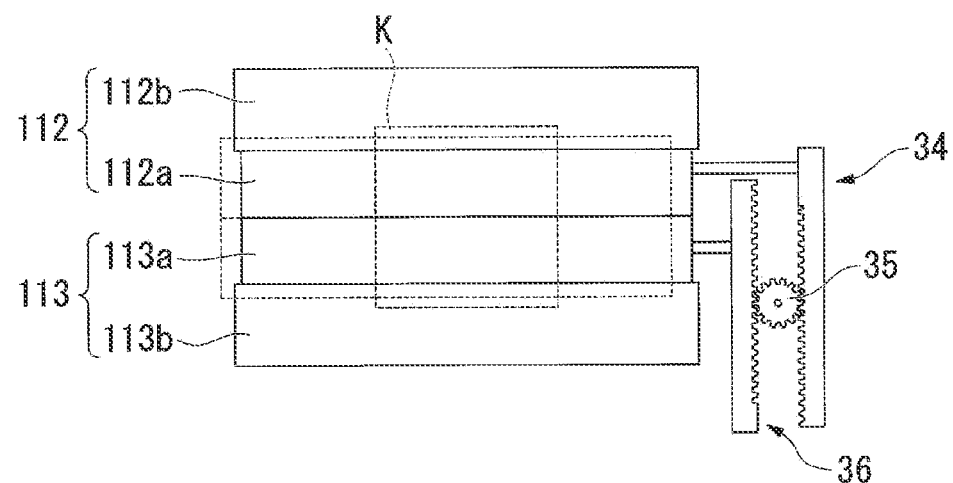
FIG. 10A shows a configuration according to a modification example of the shutter member.
Figure 10B:
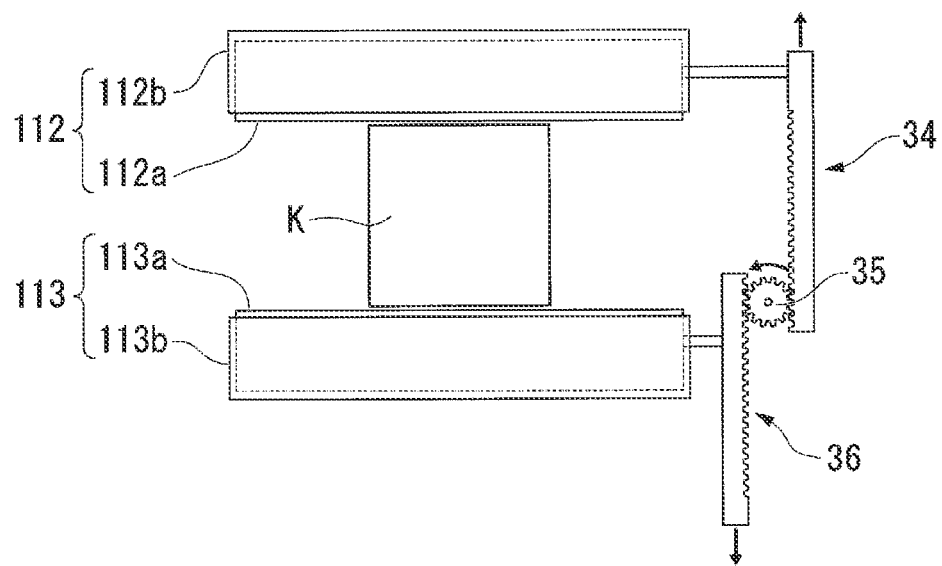
FIG. 10B shows a configuration according to a modification example of the shutter member.

For example, while the shutter member 12 in the shutter unit in the embodiments is described as being formed of two shutters, the number of shutters forming the shutter member is not particularly limited. For example, as shown in FIGS. 10A and 10B, each of a first shutter 112 and a second shutter 113 may be formed of two shutters. As shown in FIG. 10A, the first shutter 112 is formed of two shutters 112a and 112b, and the second shutter 113 is formed of two shutters 113a and 113b. As shown in FIG. 10B, the shutter 112a is fixed to the first moving member 34, and the shutter 112b moves, accompanying the shutter 112a moved by the first moving member 34. Similarly, the shutter 113a is fixed to the second moving member 36, and the shutter 113b moves, accompanying the shutter 113a moved by the second moving member 36. In the configuration according to this modification example, the width of the shutters moved by the first moving member 34 and the second moving member 36 is narrower than in the embodiments. Therefore, the space needed for opening the shutters can be reduced. Achieving further space-saving in this way enables further miniaturization of the projector.

A projector according to an aspect of the disclosure includes: a light source; a light modulation device modulating light emitted from the light source according to image information and thus forming image light; a projection system projecting the light modulated by the light modulation device onto a target projection surface; an optical member guiding the light from the light modulation device to the projection system; and a shutter unit that is arranged between the optical member and the projection system and that can block an optical path between the optical member and the projection system. The shutter unit has: a drive motor; a transmission member transmitting a rotational drive force of the drive motor; and a shutter member that is arranged on an optical path of the light emitted from the optical member and that moves, linked to a movement of the transmission member. The shutter member is provided facing a facing area facing the projection system. At least a part of the transmission member is provided facing the facing area. The drive motor is provided outside the facing area.

In the projector according to the above aspect, the drive motor may have a rotary shaft. The transmission member may have a first engagement member provided on the rotary shaft, a second engagement member to which a rotational drive force of the first engagement member is transmitted, and a first moving member having a first engagement part to which a rotational drive force of the second engagement member is transmitted. The shutter member may move, linked to a movement of the first moving member. The second engagement member and the first engagement part may be arranged in such a way that a direction of thickness of each of the second engagement member and the first engagement part is laid along a direction of an optical axis of the projection system.

In the projector according to the above aspect, the shutter member may have a first shutter and a second shutter. The first moving member may have a second engagement part. The transmission member may further have a third engagement member engaging with the second engagement part, and a second moving member having a third engagement part to which a rotational drive force of the third engagement member is transmitted. The first shutter may be fixed to the first moving member and may move, linked to a movement of the first moving member. The second shutter may be fixed to the second moving member and may move, linked to a movement of the second moving member.

In the projector according to the above aspect, the transmission member may further have a first rail slidably guiding the first moving member, a second rail slidably guiding the second moving member, a leaf spring pressing the first moving member and the second moving member against the first rail and the second rail, and a ball member arranged between each of the first moving member and the second moving member, and the leaf spring.

What is claimed is:

1. A projector comprising:
a projection system projecting image light onto a target projection surface; and
a shutter unit that is arranged at a light incident side of the projection system and that can block an optical path, wherein
the shutter unit has
a drive motor,
a transmission member transmitting a rotational drive force of the drive motor, and
a shutter member arranged on the optical path and moving, linked to a movement of the transmission member,
the shutter member is provided facing a facing area facing the projection system,
at least a part of the transmission member is provided facing the facing area, and
the drive motor is provided outside the facing area.

2. The projector according to claim 1, further comprising a lens shift mechanism arranged between the projection system and the shutter unit, wherein
the lens shift mechanism can move the projection system within a lens movement area in relation to the shutter unit, and
outside the facing area is outside the lens movement area.

3. The projector according to claim 2, further comprising an opening shielded by the shutter member, wherein
a part of the transmission member is provided at a position outside the opening and facing the lens movement area.

4. The projector according to claim 1, further comprising a light source, a plurality of light modulation elements modulating light emitted from the light source according to image information and thus forming image light, and an optical member guiding the image light from the plurality of light modulation elements to the projection system, wherein
the shutter unit is arranged between the optical member and the projection system.

5. The projector according to claim 1, wherein
the drive motor has a rotary shaft,
the transmission member has
a first engagement member provided on the rotary shaft,
a second engagement member to which a rotational drive force of the first engagement member is transmitted, and
a first moving member having a first engagement part to which a rotational drive force of the second engagement member is transmitted,
the shutter member moves, linked to a movement of the first moving member, and
the second engagement member and the first engagement part are arranged in such a way that a direction of thickness of each of the second engagement member and the first engagement part is laid along a direction of an optical axis of the projection system.

6. The projector according to claim 5, wherein the shutter member has a first shutter and a second shutter, the first moving member has a second engagement part, the transmission member further has a third engagement member engaging with the second engagement part, and a second moving member having a third engagement part to which a rotational drive force of the third engagement member is transmitted, the first shutter is fixed to the first moving member and moves, linked to a movement of the first moving member, and the second shutter is fixed to the second moving member and moves, linked to a movement of the second moving member.

7. The projector according to claim 6, wherein the transmission member further has a first rail slidably guiding the first moving member, a second rail slidably guiding the second moving member, a leaf spring pressing the first moving member and the second moving member against the first rail and the second rail, and a ball member arranged between each of the first moving member and the second moving member, and the leaf spring.

8. The projector according to claim 6, further comprising a switch detecting an opening/closing state of the first shutter and the second shutter, and a wiring drawn out from the switch, wherein the wiring is arranged around the first shutter and the second shutter.

\* \* \* \* \*